United States Patent
Yang et al.

(10) Patent No.: US 12,490,259 B2
(45) Date of Patent: Dec. 2, 2025

(54) WHITENING UPLINK DATA STREAMS

(71) Applicant: Nokia Solutions and Networks Oy, Espoo (FI)

(72) Inventors: Roy Yang, Buffalo Grove, IL (US); Francis Dominique, Sunnyvale, CA (US); Rajeev Agrawal, Glenview, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 335 days.

(21) Appl. No.: 18/221,931

(22) Filed: Jul. 14, 2023

(65) Prior Publication Data
US 2024/0023092 A1    Jan. 18, 2024

(51) Int. Cl.
*H04W 72/1268* (2023.01)
*H04W 72/232* (2023.01)

(52) U.S. Cl.
CPC ..... *H04W 72/1268* (2013.01); *H04W 72/232* (2023.01)

(58) Field of Classification Search
USPC .......................................................... 370/329
See application file for complete search history.

(56) References Cited

U.S. PATENT DOCUMENTS

| | | | |
|---|---|---|---|
| 9,265,080 B1* | 2/2016 | Palin | H04W 76/15 |
| 2011/0280200 A1 | 11/2011 | Fuchs et al. | 370/329 |
| 2012/0256726 A1* | 10/2012 | Honkanen | G01S 3/48 |
| | | | 340/10.1 |
| 2016/0157078 A1* | 6/2016 | Palin | H04W 4/80 |
| | | | 455/41.2 |
| 2021/0006944 A1 | 1/2021 | Raghothaman et al. | |
| 2021/0306039 A1 | 9/2021 | Vijayan et al. | |
| 2022/0014963 A1 | 1/2022 | Yeh et al. | |
| 2022/0029670 A1* | 1/2022 | Fakoorian | H04L 25/0224 |
| 2022/0167236 A1 | 5/2022 | Melodia et al. | |

FOREIGN PATENT DOCUMENTS

| | | |
|---|---|---|
| CN | 103703735 A | 4/2014 |
| CN | 109075827 A | 12/2018 |
| CN | 109891765 A | 6/2019 |
| EP | 3 535 860 | 5/2018 |
| EP | 3 896 860 A1 | 10/2021 |

OTHER PUBLICATIONS

Office action received for corresponding Chinese Patent Application No. 202310870995.6, dated Dec. 27, 2024, 3 pages of office action and 3 pages of translation/summary available.
Office Action received for corresponding Finnish Patent Application No. 20225670, dated Dec. 2, 2022, 13 pages.
Office Action received for corresponding Finnish Patent Application No. 20225670, dated May 10, 2023, 14 pages.
Office action received for corresponding Chinese Patent Application No. 202310870995.6, dated Jun. 8, 2024, 8 pages of office action and 2 pages of translation available.

* cited by examiner

*Primary Examiner* — Peter G Solinsky
(74) *Attorney, Agent, or Firm* — Nokia Technologies Oy

(57) ABSTRACT

Different solutions, in which uplink data streams are whitened and after that combined, are disclosed. The whitening is performed by applying whitening parameters received in a downlink control information. The whitening parameters are based on predictions on channel conditions.

14 Claims, 5 Drawing Sheets

WHITENING UPLINK DATA STREAMS

TECHNICAL FIELD

Various example embodiments relate to wireless communications.

BACKGROUND

Communication systems are under constant development. One example is an open radio access network (open RAN), which is based on disaggregated, virtualized and software-based components. For example, base station functionalities may be disaggregated into a central unit, a distributed unit, and a radio unit, the disaggregating including physical layer functionality split between the distributed unit and the radio unit. For example, key performance measurements on physical layer/medium access layer level, for example channel estimation, are performed by the distributed unit, and quadrature signal (I/Q) sampling by the radio unit.

SUMMARY

The independent claims define the scope.

It is disclosed herein as an example implementation of an apparatus, an apparatus comprising means for performing: receiving, via a first apparatus, in a downlink control information, whitening parameters; receiving at least from a second apparatus one or more first uplink data streams; applying the whitening parameters at least on the one or more first uplink data streams resulting to one or more whitened first uplink data streams; performing one of forwarding, to the first apparatus, the one or more whitened first uplink data streams to be combined at least with one or more whitened second uplink data streams, or combining the one or more whitened first uplink data streams at least with the one or more whitened second uplink data streams and forwarding, to the first apparatus, one or more combined uplink data streams.

In a further example implementation of the apparatus, the means are further configured to perform: receiving at least from a third apparatus one or more second uplink data streams; and applying the whitening parameters on the one or more second uplink data streams resulting to the one or more whitened second uplink data streams.

In a further example implementation of the apparatus, the means are further configured to perform: receiving at least one of the one or more whitened second uplink data streams.

It is disclosed herein as an example implementation of an apparatus, an apparatus comprising means for performing: receiving, via a first apparatus, in a downlink control information whitening parameters; forwarding the whitening parameters at least to a second apparatus and to a third apparatus; receiving, after the forwarding, at least from the second apparatus one or more whitened first uplink data streams and from the third apparatus one or more whitened second uplink data streams; combining at least the one or more whitened first uplink data streams with the one or more whitened second uplink data streams to one or more combined uplink data streams; and forwarding, to the first apparatus, the one or more combined uplink data streams.

In a further example implementation of the apparatuses, the means are further configured to perform the combining by: selecting a subset of the one or more whitened first uplink data streams and the one or more whitened second uplink data streams; and combining whitened uplink data streams in the subset.

In a further example implementation of the apparatuses, the means are further configured to perform: receiving, with the whitening parameters, information indicating uplink data streams to be combined and/or bandwidth available for uplink data streams; and using said information when selecting the subset.

In a further example implementation of the apparatuses, the means are further configured to determine the number M of uplink data streams to be selected to the subset so that the number of data streams to be forwarded after combining the subset is less than or equal to the maximum number N, wherein the bandwidth available for the uplink data streams is defined as maximum number N of spatial data streams supported by an open fronthaul interface.

It is disclosed herein as an example implementation of an apparatus, an apparatus comprising means for performing: receiving, from a fourth apparatus, a request for whitening parameters for one or more uplink data streams predicted to be received via one or more second apparatuses over a radio interface and to be whitened before combined to one or more combined uplink data streams; deriving predictions for the whitening parameters based at least on a predicted channel condition in the radio interface for the one or more data streams; and transmitting, via at least the fourth apparatus, in downlink control information, the predictions as the whitening parameters for the one or more uplink data streams to be whitened.

In a further example implementation of the apparatus, the means are further configured to perform: receiving capability information of a network portion connected to the fourth apparatus via a fronthaul interface, the capability information indicating one or more nodes comprising means for applying whitening parameters and configuration information relating physical constraints of the fronthaul interface; and using the capability information when deriving the predictions.

In a further example implementation of the apparatus, the means are further configured to perform: receiving in the request further information, said further information including future scheduling information indicating resource allocation at a time the whitening parameters are to be applied, and/or measured channel conditions in the radio interface, and/or information relating to a joint reception by at least two second apparatuses at the time the whitening parameters are to be applied, and/or mobility information of one or more fifth apparatuses scheduled to transmit uplink data at the time the whitening parameters are to be applied and/or spatial stream assignment of one or more fifth apparatuses scheduled to transmit uplink data at the time the whitening parameters are to be applied; and using the further information when deriving the predictions.

In a further example implementation of the apparatus, the means for deriving the predictions are implemented as a trained model configured to receive the further information as input and to output the predictions for whitening parameters per a second apparatus.

In a further example implementation of the apparatuses the one or more whitening parameters comprise at least a set of whitening coefficients per a frequency range.

In a further example implementation of the apparatuses, the downlink control information further comprises one or more of identification information of a target apparatus of the one or more combined uplink data streams; and/or identification information of one or more target apparatuses of the one or more whitening parameters; and/or information indicating one or more uplink data streams to which at least one of the one or more whitening parameters are to be applied; and/or information indicating a time when to apply the one or more whitening parameters; and/or a set of whitening coefficients per a frequency range.

In a further example implementation of the apparatuses, an apparatus comprises at least one processor, and at least one memory including computer program code, wherein the at least one processor with the at least one memory and computer program code provide said means.

It is disclosed herein as an example implementation, a method comprising performing, by an apparatus, at least one of a first functionality, a second functionality, or a third functionality. The first functionality comprises at least: receiving, via a first apparatus, in a downlink control information, whitening parameters; receiving at least from a second apparatus one or more first uplink data streams; applying the whitening parameters at least on the one or more first uplink data streams resulting to one or more whitened first uplink data streams; forwarding, to the first apparatus, the one or more whitened first uplink data streams to be combined at least with one or more whitened second uplink data streams. The second functionality comprises at least: receiving, via a first apparatus, in a downlink control information, whitening parameters; receiving at least from a second apparatus one or more first uplink data streams; applying the whitening parameters at least on the one or more first uplink data streams resulting to one or more whitened first uplink data streams; combining the one or more whitened first uplink data streams at least with the one or more whitened second uplink data streams; and forwarding, to the first apparatus, one or more combined uplink data streams. The third functionality comprises at least: receiving, via a first apparatus, in a downlink control information whitening parameters; forwarding the whitening parameters at least to a second apparatus and to a third apparatus; receiving, after the forwarding, at least from the second apparatus one or more whitened first uplink data streams and from the third apparatus one or more whitened second uplink data streams; combining at least the one or more whitened first uplink data streams with the one or more whitened second uplink data streams to one or more combined uplink data streams; and forwarding, to the first apparatus, the one or more combined uplink data streams.

It is disclosed herein as an example implementation of a computer readable medium, a computer readable medium comprising program instructions stored thereon for at least one of a first functionality, a second functionality, or a third functionality, for performing corresponding functionality. The first functionality comprises at least: receiving, via a first apparatus, in a downlink control information, whitening parameters; receiving at least from a second apparatus one or more first uplink data streams; applying the whitening parameters at least on the one or more first uplink data streams resulting to one or more whitened first uplink data streams; forwarding, to the first apparatus, the one or more whitened first uplink data streams to be combined at least with one or more whitened second uplink data streams. The second functionality comprises at least: receiving, via a first apparatus, in a downlink control information, whitening parameters; receiving at least from a second apparatus one or more first uplink data streams; applying the whitening parameters at least on the one or more first uplink data streams resulting to one or more whitened first uplink data streams; combining the one or more whitened first uplink data streams at least with the one or more whitened second uplink data streams; and forwarding, to the first apparatus, one or more combined uplink data streams. The third functionality comprises at least: receiving, via a first apparatus, in a downlink control information whitening parameters; forwarding the whitening parameters at least to a second apparatus and to a third apparatus; receiving, after the forwarding, at least from the second apparatus one or more whitened first uplink data streams and from the third apparatus one or more whitened second uplink data streams; combining at least the one or more whitened first uplink data streams with the one or more whitened second uplink data streams to one or more combined uplink data streams; and forwarding, to the first apparatus, the one or more combined uplink data streams.

In a further example implementation of the computer readable medium, the medium is a non-transitory computer readable medium.

It is disclosed herein as an example implementation of a computer program, a computer program comprising instructions for causing an apparatus to perform at least one of a first functionality, a second functionality, or a third functionality. The first functionality comprises at least: receiving, via a first apparatus, in a downlink control information, whitening parameters; receiving at least from a second apparatus one or more first uplink data streams; applying the whitening parameters at least on the one or more first uplink data streams resulting to one or more whitened first uplink data streams; forwarding, to the first apparatus, the one or more whitened first uplink data streams to be combined at least with one or more whitened second uplink data streams. The second functionality comprises at least: receiving, via a first apparatus, in a downlink control information, whitening parameters; receiving at least from a second apparatus one or more first uplink data streams; applying the whitening parameters at least on the one or more first uplink data streams resulting to one or more whitened first uplink data streams; combining the one or more whitened first uplink data streams at least with the one or more whitened second uplink data streams; and forwarding, to the first apparatus, one or more combined uplink data streams. The third functionality comprises at least: receiving, via a first apparatus, in a downlink control information whitening parameters; forwarding the whitening parameters at least to a second apparatus and to a third apparatus; receiving, after the forwarding, at least from the second apparatus one or more whitened first uplink data streams and from the third apparatus one or more whitened second uplink data streams; combining at least the one or more whitened first uplink data streams with the one or more whitened second uplink data streams to one or more combined uplink data streams; and forwarding, to the first apparatus, the one or more combined uplink data streams.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are only presented as examples. Although the specification may refer to "an", "one", or "some" embodiment(s) and/or example(s) in several locations, this does not necessarily mean that each such reference is to the same embodiment(s) or example(s), or that a particular feature only applies to a single embodiment and/or single example. Single features of different embodiments and/or examples may also be combined to provide other embodiments and/or examples. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
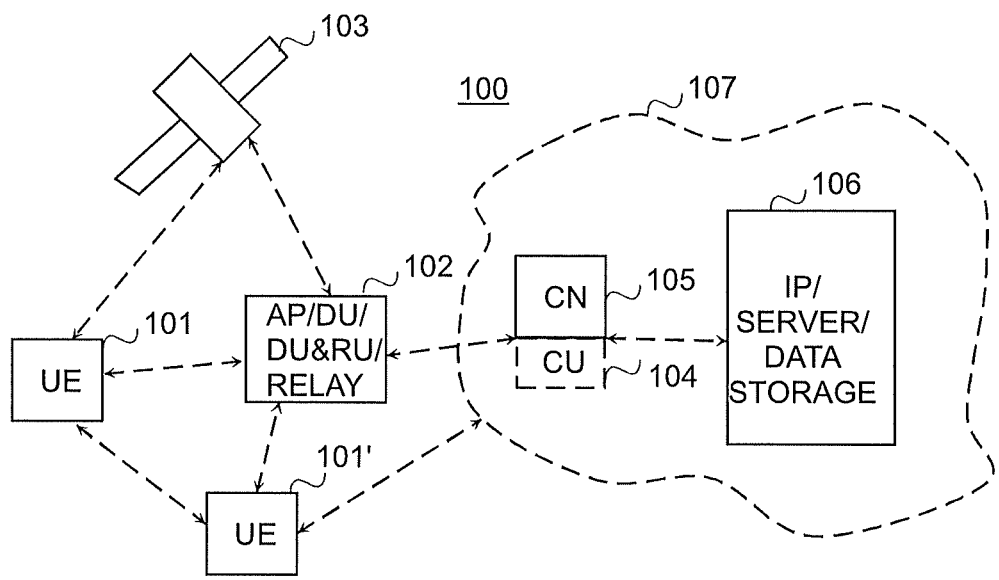
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels in a cell with an access node (such as (e/g)NodeB) providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or user plane function (UPF), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a computing device (e.g. a portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The user device may also utilize cloud. In some applications, a user device may comprise a user portable device with radio parts (such as a watch, earphones, eyeglasses, other wearable accessories or wearables) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. Further, it should be appreciated that a number of reception and/or transmission antennas in a user device may vary according to implementation and/or type of the user device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilize services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into a radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real-time functions being carried out at the RAN side (in a distributed unit, DU 102) and non-real-time functions being carried out in a centralized manner (in a central unit, CU 104). Another example of distribution, the open RAN, includes also disaggregation of certain functionalities between a distributed unit and one or more radio units (illustrated as one entity, DU&RU 102).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

It is envisaged that 5G, 6G, and beyond there will be radio access networks that deploy distributed antennas, where one distributed unit is connected to a plurality of radio units, forming thereby a shared cell. One example of such a radio access network is the open radio access network (open RAN, O-RAN), which, as said above, is based on disaggregated, virtualized and software-based components. In the open RAN, a distributed unit is called O-DU, and the radio unit O-RU.

Figure 2:
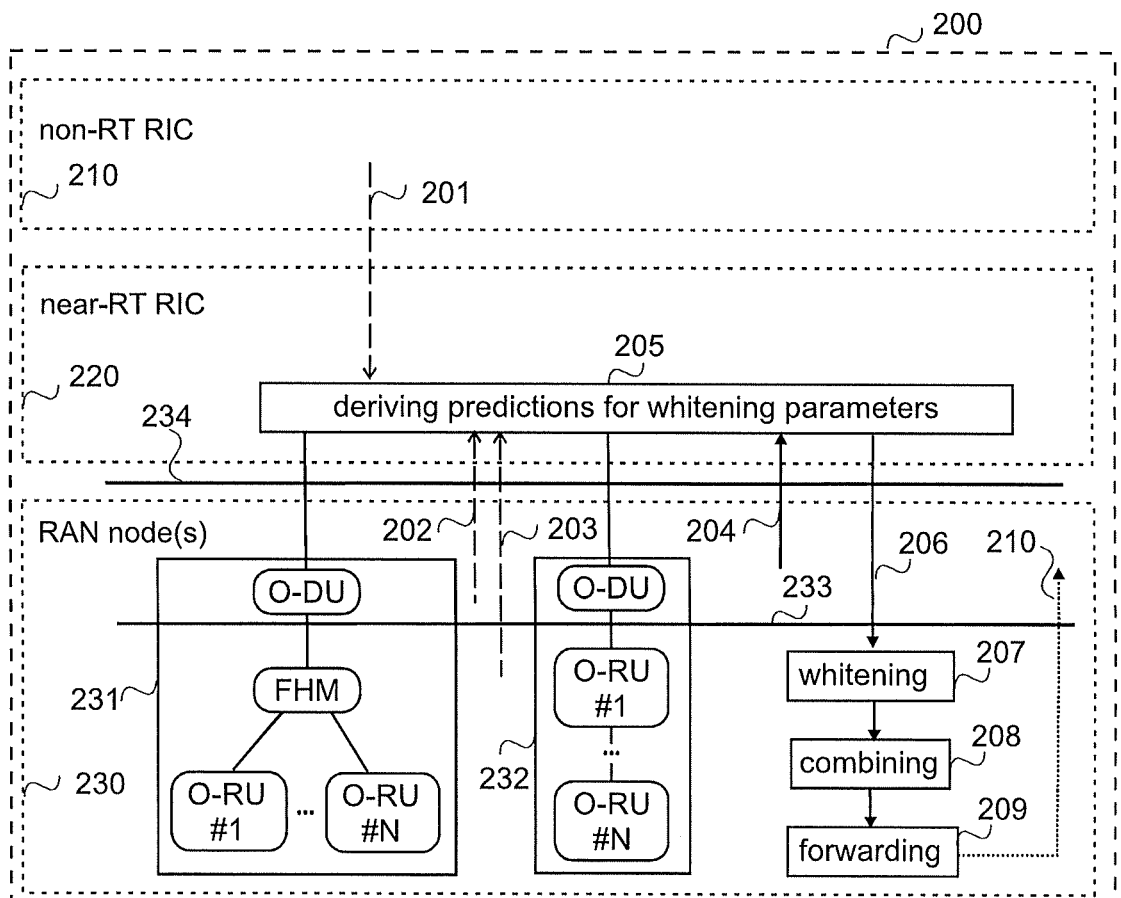
FIG. 2 illustrates an exemplified open radio access network architecture.

FIG. 2 illustrates a highly simplified example of an O-RAN logical architecture disclosing only some operational entities and components, with a non-limiting example of their mapping. The high-level view of the O-RAN architecture comprises network functions, a service management and orchestration framework (SMO) to manage the network functions and an O-Cloud (O-RAN Cloud) to host cloudified network functions.

Referring to FIG. 2, O-RAN 200 comprises an open platform to interact and guide the behavior of the radio access network, for example radio access network nodes in a radio access network nodes part 230. The open platform may be called xRAN controller or a radio intelligent controller (RIC), and it comprises a non-real-time part (non-RT RIC) 210 and a near-real-time part (near-RT RIC) 220. The non-real-time part 210 may be part of the service management and orchestration framework, and the near-real-time part 220 may be on a radio access side. (The radio access side includes the radio access network nodes.) An interface (not illustrated in FIG. 2) between the non-real-time part 210 and the near-real-time part 220 is A1 interface. An interface 234 between the near-real-time part 220 and the radio access network nodes part 230 is E2 interface. An interface (not illustrated in FIG. 2) between the non-real-time part 210 and the radio access network nodes part 230 is O2 interface. Further, different algorithms, for example optimization algorithms, and services can be instantiated as applications on top of the underlying radio intelligent controller (the open platform). The applications, that can be called "xApps", can interact with the radio intelligent controller by means of one or more application programming interfaces that may be called "API X" and that can be freely defined.

The shared cell may be provided by a star connection 231 or by a daisy-chained connection 232 between radio access nodes in the radio access network nodes part 230. In both connections 231, 232 a distributed unit O-DU is configured to support the E2 interface 234 to the near-real-time part 220 and an open fronthaul interface 233 towards a fronthaul (towards downlink). The term "fronthaul" is used herein to mean a network portion that is connected to the distributed unit via the fronthaul interface.

In the star connection 231, a plurality of radio units O-RU #1, ..., O-RU #N (at least two), which may belong to one cell identifier, or one or more of them may belong to another cell identifier/other cell identifiers, are connected to one distributed unit O-DU via a unit/component called fronthaul multiplexer, FHM. FHM is configured to combine, or aggregate, uplink signals (eCPRI messages) from the plurality of the radio units, for example through a combine function, and behave as a radio unit towards the O-DU, and is configured to support the open fronthaul interface 233. The star connection 231 may be called an FHM mode, in which fronthaul comprises FHM and the plurality of radio units.

In the daisy-chained connection 232 one of a plurality of radio units O-RU #1, ..., O-RU #N (at least two), which all belong to one cell identifier, is connected to one distributed unit O-DU over the open fronthaul interface 233, the other radio units being connected in a chain-like manner so that a radio unit is connected to one radio unit in northbound direction (uplink), and cascade radio units, i.e. radio units having also a connection in southbound direction are configured combine an uplink signal (eCPRI message) with data received over the air, for example by a combine function, and forward combined uplink signal. The daisy-chained 232 connection may be called a cascade mode, in which fronthaul comprises the plurality of radio units.

In implementations in which a lower layer functional split is applied, the distributed unit O-DU performs channel estimation, equalization and decoding functions, whereas the radio units, and FHM, perform Fast Fourier transformation, cyclic prefix addition/removal, and beamforming functions. To reduce noise and interference caused by combining the signal, whitening will be performed in the fronthaul, which comprises O-RUs and may comprise FHM, as will be described in more detail below. Since the channel estimation function locates in the distributed unit, not in the fronthaul, the near-real-time RIC 220 comprises a component (unit, node) called herein an intelligent whitening controller, which is configured to derive predictions for whitening parameters, for example by predicting channel conditions, to be applied in the fronthaul. Hence, the whitening may be called a predictive whitening. The intelligent whitening controller may be, or comprise, a machine learning based model, or a corresponding algorithm.

The intelligent whitening controller has received, for example during an initial configuration phase, policy (signal 201) from the non-real-time RIC 210. The policy is converted into utility metric used in training the model. Further, the intelligent whitening controller has received, for example during an initial configuration phase, from different radio access network nodes capability information (signals 202, 203). It should be appreciated that depending on an implementation, capability information may be provided to the intelligent whitening controller once during the initial configuration phase, or it may be provided also during operation to update the model. The capability information may indicate one or more nodes comprising means for applying whitening parameters, i.e. nodes that are configured to support whitening, and configuration information relating physical constraints of the fronthaul interface. In other words, the intelligent whitening controller will have knowledge of the shared cell topologies per a shared cell, including number of radio units served by a distributed unit, number of spatial uplink streams per a radio unit, and radio units to cell identifiers mapping. The intelligent whitening controller may also have information on a maximum number of spatial streams that may carried over the open fronthaul interface 233. The capability information is received over the E2 interface 234 from the distributed unit, which may combine capability signalling received from the fronthaul.

A spatial stream means herein an output signal from a radio unit and it is interchangeable with term "uplink data stream". Hence the term covers output signals regardless of a number of antenna elements in a radio unit. A radio unit that has a plurality of antenna elements may be configured to process input signals received by the antenna elements by fast Fourier transformation and beamforming functions to form a new set of output signals, i.e. beams. A radio unit that has a limited number of antenna elements may be configured to process input signals received by the antenna elements only by fast Fourier transformation with no beamforming functions to form a new set of output signals.

In operation, the intelligent whitening controller receives, from the distributed unit over the E2 interface 234, a request (signal 204) for whitening parameters for one or more uplink data streams predicted to be received via one or more radio units over the air, more precisely, over a radio interface, to be whitened before combined to one or more combined uplink data streams. The intelligent whitening controller derives (block 205) predictions for the whitening parameters based at least on a predicted channel condition in the radio interface for the one or more data streams, and transmits, via at least the distributed unit, over the E2 interface 234 and over the open fronthaul interface 233, in downlink control information (206), the predictions as the whitening parameters for the one or more uplink data streams to be whitened in the fronthaul. The data stream (not illustrated in FIG. 2), is whitened (block 207) by applying the whitening parameters, the whitened data streams are combined (block 208) and forwarded (block 209) as combined uplink data stream (210) towards the distributed unit and over the open fronthaul interface 233. The process of whitening first, then combining, will reduce signal degradation in the post-combined signal. Whitening means that a data stream (signal) is divided by the magnitude of the estimated noise and interference, which may be conveyed in the whitening parameters, such that the noise and interference component of the post-whitened data stream will have a zero mean and finite variance. Since the intelligent whitening controller is in the near-real-time RIC, whitening decisions can be made on a near real time scale, the controller providing outputs with a time scale of less than 10 milliseconds.

Figure 3:
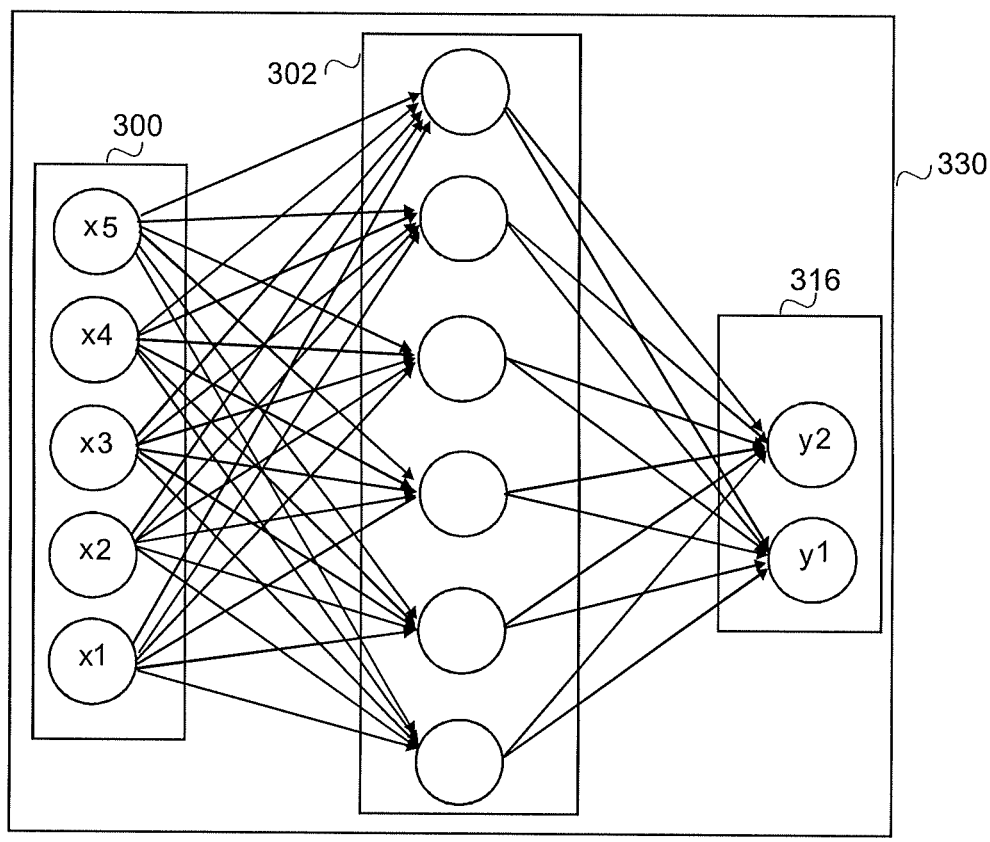
FIG. 3 is a block diagram illustrating an example of a neural network.

FIG. 3 illustrates one example of a deep learning neural network that may be used in the intelligent whitening controller, for example to provide means for deriving predictions for the whitening parameters. It should be appreciated that also other kinds of artificial intelligence based models, or corresponding algorithms, that are configurable or trainable to determine optimal set of whitening parameters for time frequency resources per a radio unit may be used. Such an algorithm or an artificial intelligence based model aims to predict the noise and interference covariance of spatial uplink streams incoming over the air based on a predicted channel conditions of one or more apparatuses, such as user equipments.

Referring to FIG. 3, a deep neural network (DNN) 330 is an artificial neural network comprising multiple hidden layers 302 (only one shown in FIG. 3) between the input layer 300 and the output layer 316. Each hidden layer 302 comprise nodes where the computation takes place, as is known in the art. Training of DNN allows it to find the correct mathematical manipulation to transform the input into the proper output.

In the illustrated example, in operation, the inputs to the input layer include:

Future scheduling information (x1) indicating resource allocation at a time the whitening parameters are to be applied. This information may include an apparatus's, for example UE's, frequency resource assignment in a future targeted slot, and more than one apparatus may be paired by a scheduler to share the same time frequency resources.

Measured channel conditions (x2) in the radio interface. This may include channel state information for the apparatuses in a current slot.

Information (x3) relating to a joint reception by at least two second apparatuses at the time the whitening parameters are to be applied. This may include measurement results related to multiple transmission-reception points, for whitening parameters across two or more radio units for joint reception operation, for example uplink coordinated multi-points.

Mobility information (x4) of one or more apparatuses scheduled to transmit uplink data at the time the whitening parameters are to be applied. This information may include apparatus's current position, mobility trajectory, and projected position in a future targeted slot.

Spatial stream assignment (x5) of one or more apparatuses scheduled to transmit uplink data at the time the whitening parameters are to be applied. This information may be used to determine whitening parameters for a subset of spatial streams to be combined.

It should be appreciated that the inputs may include one of the above listed, two of the above listed, three of the above listed or four of the above listed. The information for the inputs may be received entirely in a request from a distributed unit, or some information, for example projected location, may be received from one or more other intelligent controller modules in the near real time RIC, or in a corresponding intelligent management layer in which also the intelligent whitening controller locates.

Training dataset for the model is composed of the same inputs, using measured values or simulated values.

In the illustrated example of FIG. 3, it is assumed that under one distributed unit there is two radio units, and hence the model is outputting in the output layer 316 one set (y1) of predictions for whitening parameters for a first radio unit and a second set (y2) of predictions for whitening parameters for a second radio unit. It should be appreciated that the number of sets corresponds to the number of radio units under one distributed unit. Further, the final output, per a set, is one or more whitening parameters. The one or more whitening parameters may comprise at least a set of whitening coefficients per a frequency range. For example, at different physical resource block, or frequency sub-band, the whitening coefficients may be different. In other words, the whitening parameters may cover a certain range of time frequency resources with a finite granularity, for example a physical resource block per a user equipment (apparatus) or per a group of user equipments (apparatuses).

Figure 4:
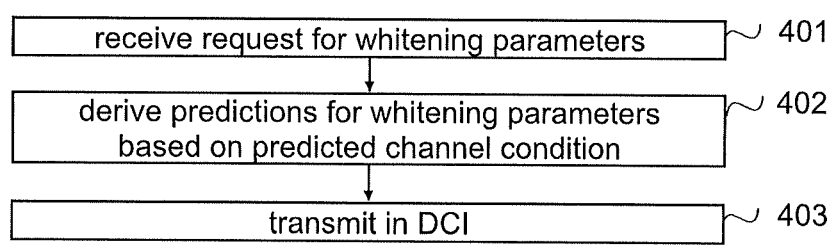
FIGS. 4 to 7 are flow charts illustrating example functionalities.

FIG. 4 is a flow chart illustrating functionality of the intelligent whitening controller.

Referring to FIG. 4, the intelligent whitening controller receives (block 401) a request for whitening parameters for one or more uplink data streams predicted to be received via one or more apparatuses over a radio interface and to be whitened before combined to one or more combined uplink data streams. The request (whitening request message) may contain as information one or more of the inputs described above with FIG. 3. In other words, the request may contain one or more of following: a target time instant, for example a slot or a symbol offset, when the whitening is to be performed, a scheduling decision of a distributed unit with regard to the time frequency resources that one or more apparatuses, such as user equipments, occupy at the target time instant, the current channel state information of the respective one or more apparatuses and their mobility trajectory, user grouping information (multiple user pairing or uplink coordinated multi-points), beam assignment, etc.

Then predictions for the whitening parameters based at least on a predicted channel condition in the radio interface for the one or more data streams are derived (block 402), for example as described above with FIG. 3, using an algorithm or a model.

The predictions are transmitted (block 403), to one or more apparatuses, via at least a further apparatus, in downlink control information (DCI), as the whitening parameters for the one or more uplink data streams to be whitened. The one or more whitening parameters may comprise whitening coefficients. The downlink control information, for example a whitening control message, may comprise also identification information of a target apparatus of the one or more combined uplink data streams; and/or identification information of one or more target apparatuses of the one or more whitening parameters; and/or information indicating one or more uplink data streams to which at least one of the one or more whitening parameters are to be applied; and/or information indicating a time when to apply the one or more whitening parameters.

In an implementation, the intelligent whitening controller may aggregate the whitening parameters for the time frequency resources together to cover a full bandwidth of a radio unit in one downlink control information message.

Figure 5:
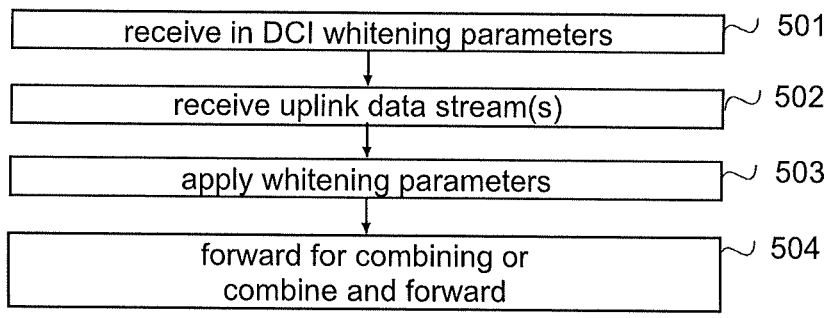

FIG. 5 is a flow chart illustrating functionality of an apparatus at least applying the whitening parameters. Depending on an implementation, the apparatus may be FHM or a radio unit. Different example implementations are disclosed with FIGS. 8 to 11.

Referring to FIG. 5, whitening parameters are received (block 501), receiving, via a first apparatus, in a downlink control information, for example in a whitening parameters message. The first apparatus may be a distributed unit. One or more first uplink data streams are received (block 502) at least from a second apparatus. The second apparatus may be a radio unit or an apparatus, for example a user equipment, transmitting over the air. The whitening parameters are applied (block 503) at least on the one or more first uplink data streams resulting to one or more whitened first uplink data streams. Then one of following is performed (block 504): forwarding, to the first apparatus, the one or more whitened first uplink data streams to be combined at least with one or more whitened second uplink data streams, or combining the one or more whitened first uplink data streams at least with the one or more whitened second uplink data streams and forwarding, to the first apparatus, one or more combined uplink data streams.

The open fronthaul interface, and hence a link established over the open fronthaul interface, has a limited bandwidth, it may be that the bandwidth is not large enough to allow transmitting all individual uplink data streams. In some implementations, a subset of the uplink data streams are combined until the final bandwidth of post-combined uplink data streams and the left-over individual uplink data streams match the bandwidth of the fronthaul interface. In other words, combining is performed when needed. Further, in some implementations, the downlink control information indicates data streams to which the whitening parameters are to be applied, and hence the left-over individual uplink data streams may not be whitened.

Figure 6:
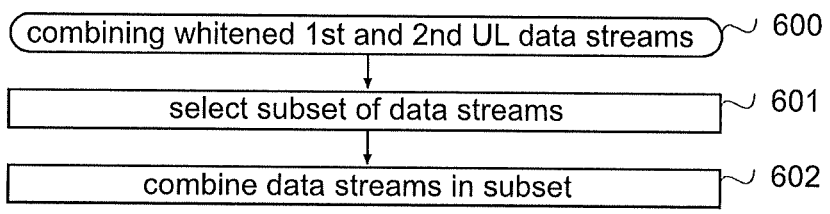

Referring to FIG. 6, when whitened first and second uplink data streams, i.e. uplink data streams whitened by different radio units, are combined (block 600), a subset of the one or more whitened first uplink data streams and the one or more whitened second uplink data streams is selected (block 601); and whitened uplink data streams in the subset are combined (block 602).

When the subset is selected (block 601) information received with the whitening parameters may be used, said information indicating uplink data streams to be combined and/or bandwidth available for uplink data streams.

Figure 7:
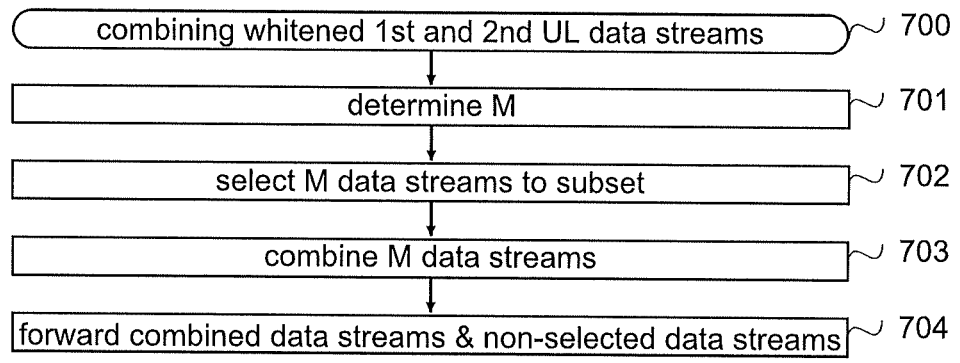

FIG. 7 illustrates another example relating to combining a subset of uplink data streams. In the example, the bandwidth available for the uplink data streams is defined as maximum number N of spatial data streams supported by the open fronthaul interface.

Referring to FIG. 7, when whitened first and second uplink data streams, i.e. uplink data streams whitened by different radio units, are combined (block 700), the number M of uplink data streams to be selected to the subset is determined (block 701) so that the number of data streams to be forwarded after combining the subset is less than or equal to the maximum number N. The target is the maximum number N but it may be that it cannot be met due to some topology, or some other capacity constraints. Then M uplink data streams are selected (block 702) to the subset, and the M selected uplink data streams are combined (block 703), and the combined uplink data streams and data streams that were not selected and hence not combined are forwarded in block 704.

For example, assuming that there are two radio units under a distributed unit, both radio units having 4 antennas, and thereby both having 4 uplink data streams, resulting that there are 8 uplink data streams to be delivered over the open fronthaul interface, whose bandwidth is 4 data streams. This means that all uplink data streams have to be combined, for example combining data streams of two antennas in corresponding radio units, resulting two combined data streams per a radio unit, altogether four combined data streams and matching to the bandwidth of the open fronthaul interface. Another way is to combine a data stream from radio unit 1 with a data stream from radio unit 2, and do such combining to all data streams, resulting to four combined data streams.

In another example, assuming that there are two radio units under a distributed unit, both radio units having 4 antennas, and thereby both having 4 uplink data streams, resulting that there are 8 uplink data streams to be delivered over the open fronthaul interface, whose bandwidth is 6 data streams. This means that four data streams are to be combined. For example, data streams of two antennas in one of the radio units may be combined, resulting to two combined data streams, whereas no combining is done to data streams of the other radio unit, resulting to six data streams that match to the bandwidth of the open fronthaul interface. Another way is to combine a data stream from radio unit 1 with a data stream from radio unit 2, and do such combining to two data streams per a radio unit, resulting to two combined data streams and four non-combined data streams.

Figure 8:
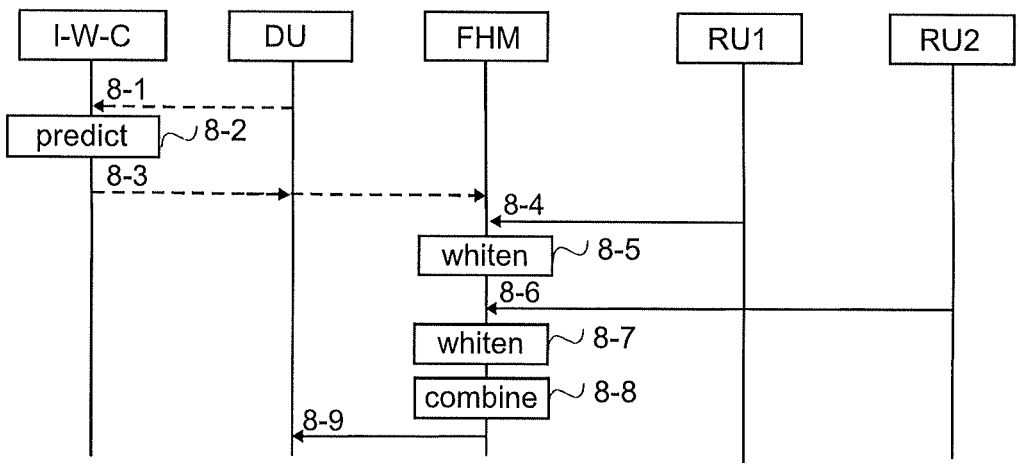
FIGS. 8 to 11 illustrate information exchange.
Figure 9:
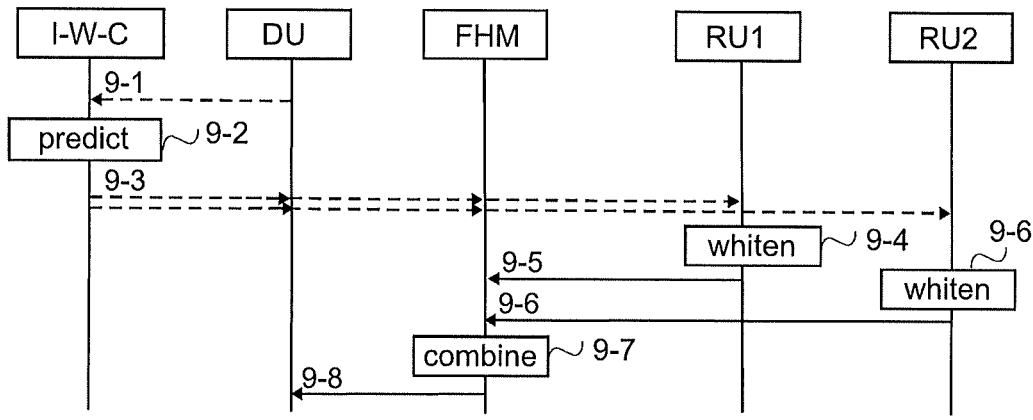
Figure 10:
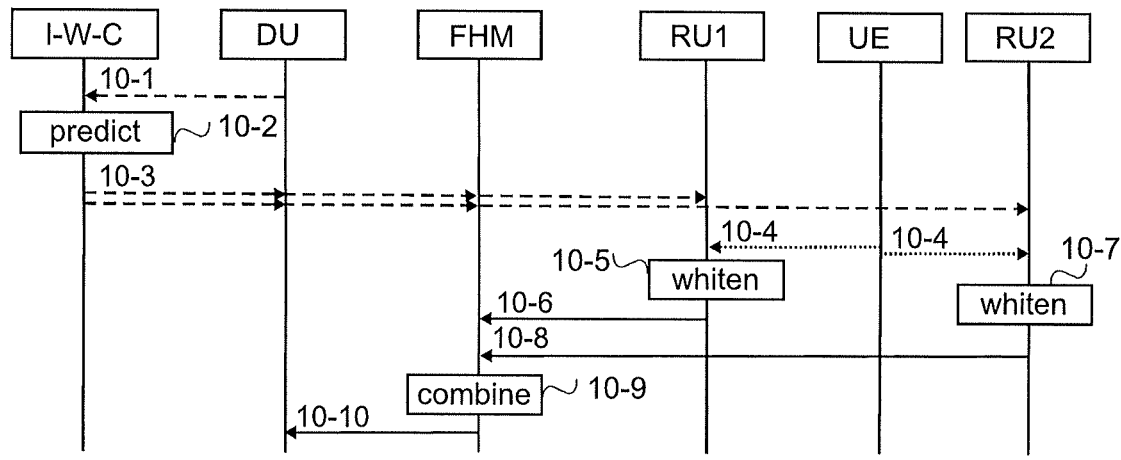
Figure 11:
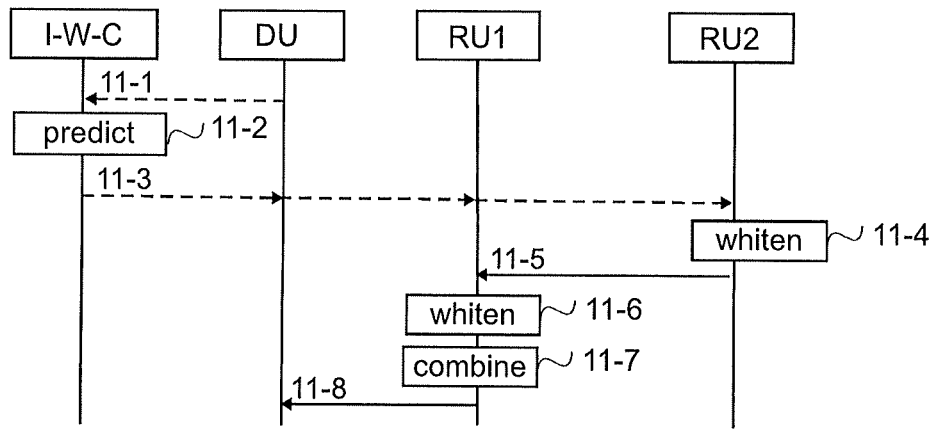

FIGS. 8 to 11 illustrates different implementation examples for the above described functionalities and related information exchange, FIGS. 8 to 10 in the FHM mode and FIG. 11 in the cascade mode. For the clarity of description, it is assumed that there are two radio units, RU1 and RU2, under one distributed unit DU. Further, one data stream per a radio unit is used as a non-limiting example. Applying the examples to implementations with three or more radio units under one distributed unit and/or with more than one data stream per a radio unit is a straightforward process for one skilled in the art. The intelligent whitening controller is depicted by I-W-C. Different interfaces, like E2 between DU and I-W-C, or the open fronthaul interface between FHM or RU1, over which signaling (messages, information) are transmitted, are not illustrated. Further, in the illustrated examples, no over the air (over the radio interface) received data streams from apparatuses, for example UEs, are illustrated except in FIG. 10 (dotted lines). Control signaling (control flow, or control messages) are depicted with dash lines, solid lines depict uplink data streams (data flows).

In the example illustrated in FIG. 8, FHM is configured to perform both whitening and combining.

Referring to FIG. 8, based on a scheduling decision made by DU, DU transmits a request (control message 8-1) for whitening parameters to I-W-C. Different examples of the content of the request have been given above. I-W-C then predicts (block 8-2) the whitening parameters, as described above, and transmits them in a downlink control information (8-3), for example in a whitening control message, via the DU to FHM. In other words, DU is a middle man that pass along the whitening control message from the I-W-C to FHM.

FHM receives from RU1 an uplink data stream (message 8-4), and whitens (block 8-5) the uplink data stream by applying whitening parameter for that data stream to obtain a whitened data stream. Correspondingly, FHM receives from RU2 an uplink data stream (message 8-6), and whitens (block 8-7) the uplink data stream by applying whitening parameter for that data stream. The whitened data streams are then combined (block 8-8) and the combined whitened data streams are forwarded (message 8-9) to DU for further processing and forwarding.

In the example illustrated in FIG. 9, radio units are configured to perform whitening and FHM is configured to perform combining.

Referring to FIG. 9, based on a scheduling decision made by DU, DU transmits a request (control message 9-1) for whitening parameters to I-W-C. Different examples of the content of the request have been given above. I-W-C then predicts (block 9-2) the whitening parameters, as described above, and transmits them in a downlink control information (9-3), for example in a whitening control message per a radio unit, or in one whitening control message, via the DU, and via the FHM to corresponding radio units RU1, RU2. In other words, DU and FHM are middle mans that pass along the whitening control message from the I-W-C to RU1 and RU2.

RU1 receives over the air an uplink data stream (not illustrated) and whitens (block 9-4) the uplink data stream by applying whitening parameter for that data stream to obtain a whitened data stream, which RU1 then transmits (message 9-5) to FHM. Correspondingly, RU2 receives over the air an uplink data stream (not illustrated) and whitens (block 9-6) the uplink data stream by applying whitening parameter for that data stream to obtain a whitened data stream, which RU2 then transmits (message 9-6) to FHM. The whitened data streams are then combined (block 9-7) by FHM and the combined whitened data streams are forwarded (message 9-8) to DU for further processing and forwarding.

The example illustrated in FIG. 10 describes an example of a joint reception scheme for an apparatus, for example UE, located in the coverage areas of RU1 and RU2 simultaneously. The joint reception scheme may be uplink coordinated multi-points. In the example illustrated in FIG. 10, radio units are configured to perform whitening and FHM is configured to perform combining.

Referring to FIG. 10, based on a scheduling decision made by DU, DU transmits a request (control message 10-1) for whitening parameters to I-W-C. Different examples of the content of the request have been given above, including scheduling information of UE in RU1 and RU2. I-W-C then predicts (block 10-2) the whitening parameters, as described above, for example according to UE's predicted channel conditions to both RU1 and RU2. I-W-C transmits the whitening parameters in a downlink control information (10-3), for example in a whitening control message per a radio unit, or in one whitening control message, via the DU, and via the FHM to corresponding radio units RU1, RU2. In other words, DU and FHM are middle mans that pass along the whitening control message from the I-W-C to RU1 and RU2.

RU1 receives over the air an uplink data stream (message 10-4) from UE and whitens (block 10-5) the uplink data stream by applying whitening parameter for that data stream to obtain a whitened data stream, which RU1 then transmits (message 10-6) to FHM. Correspondingly, RU2 receives over the air the uplink data stream (message 10-4) and whitens (block 10-7) the uplink data stream by applying whitening parameter for that data stream to obtain a whitened data stream, which RU2 then transmits (message 10-8) to FHM. The whitened data streams are then combined (block 10-9) by FHM and the combined whitened data streams are forwarded (message 10-10) to DU for further processing and forwarding.

In the example illustrated in FIG. 11, radio units in the cascade mode are configured to perform whitening and combining, except the last radio unit in the cascade mode may be configured to perform the whitening only. Further, the first radio unit in the cascade is configured to support the open fronthaul interface, and is connected to DU.

Referring to FIG. 11, based on a scheduling decision made by DU, DU transmits a request (control message 11-1) for whitening parameters to I-W-C. Different examples of the content of the request have been given above. I-W-C then predicts (block 11-2) the whitening parameters, as described above, and transmits them in a downlink control information (11-3), for example in a whitening control message, per a radio unit, one whitening control message via the DU to RU1 and one whitening control message via the DU and via RU1 (a first hop) to RU2. In other words, DU is a middle man and a radio unit may be a middle man that pass along the whitening control message from the I-W-C to a target radio unit.

RU2 receives over the air an uplink data stream (not illustrated) and whitens (block 11-4) the uplink data stream by applying whitening parameter for that data stream to obtain a whitened data stream, which RU2 then transmits (message 11-5) to RU1. Correspondingly, RU1 receives over the air an uplink data stream (not illustrated) and whitens (block 11-6) the uplink data stream by applying whitening parameter for that data stream to obtain a whitened data stream, which RU1 then combines (block 11-7) with the whitened data stream it obtained from RU2. The combined whitened data streams are forwarded (message 11-8) to DU for further processing and forwarding. Should there be a further radio unit between RU1 and DU, the combined whitened data stream would be processed by the further radio unit in a similar way as RU1 processes the data stream from RU 2.

As can be seen from the above examples, whitening can be performed on spatial streams that are to be combined prior to combining them, and only a subset of spatial streams may be whitened and combined. Further, the solutions are applicable to massive MIMO radio units, and legacy radio units. Using the predictive approach, it is possible to whiten data streams without a channel estimation functionality, which improves signal to noise and interference ratio in the lower layer functional split solutions, resulting in improved link level and system performance, higher throughput and better user experience.

The blocks, related functions, and information exchanges (messages/signals) described above by means of FIGS. 1 to 11 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information.

Figure 12:
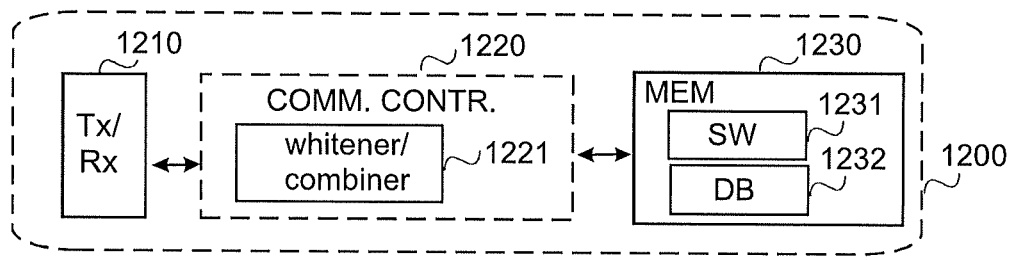
FIGS. 12 to 14 are schematic block diagrams.
Figure 13:
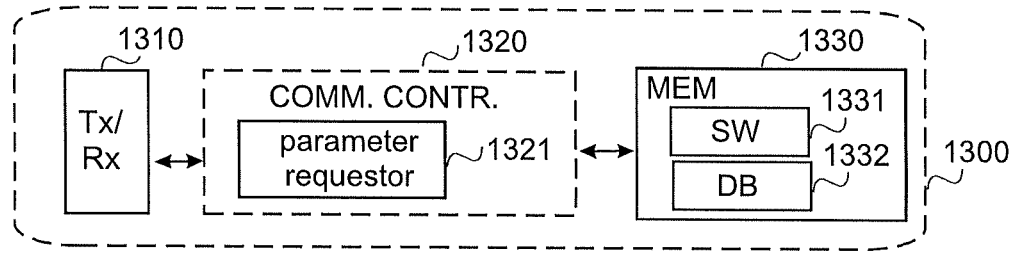
Figure 14:
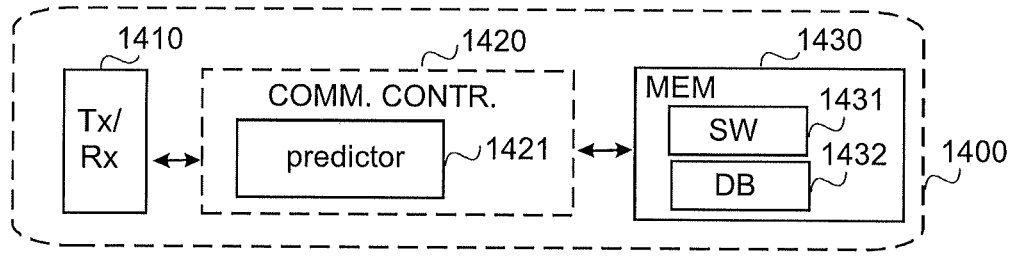

FIG. 12 illustrates an apparatus 1200 configured to perform the whitening and/or combining according to some embodiments. In other words, the apparatus may implement FHM functionality or radio unit functionality. FIG. 13 illustrates an apparatus 1300 configured to request whitening parameters according to some embodiments. In other words, the apparatus may implement distribute unit functionality. FIG. 14 illustrates an apparatus 1400 configured to derive the whitening parameters according to some embodiments. In other words, the apparatus implements the whitening controller functionality. It should be appreciated that any of the apparatuses may be implemented by physically distributed devices forming one logical apparatus.

The apparatus 1200, 1300, 1400 may comprise one or more communication control circuitry 1220, 1320, 1420, such as at least one processor, and at least one memory 1230, 1330, 1430 including one or more algorithms 1231, 1331, 1431, such as a computer program code (software) wherein the at least one memory and the computer program code (software) are configured, with the at least one processor, to cause the apparatus to carry out any one of the exemplified functionalities of a corresponding apparatus described above. Said at least one memory 1230, 1330, 1430 may also comprise at least one database 1232, 1332, 1432.

Referring to FIG. 12, the one or more communication control circuitry 1220 of the apparatus 1200 comprise at least whitener/combiner circuitry 1221 which is configured to perform at least whitening or combining or both whitening and combining according to embodiments, and possibly providing topology information and/or capability information. To this end, the whitener/combiner circuitry 1221 of the apparatus 1200 is configured to carry out at least some of the functionalities of the apparatus described above, e.g., by means of FIGS. 2 to 11, by a radio unit or FHM, using one or more individual circuitries.

Referring to FIG. 13, the one or more communication control circuitry 1320 of the apparatus 1300 comprise at least parameter requestor circuitry 1321 which is configured to perform requesting whitening parameters, and possibly providing topology information and/or capability information, according to embodiments. To this end, the parameter requestor circuitry 1321 of the apparatus 1300 is configured to carry out at least some of the functionalities of the apparatus described above, e.g., by means of FIGS. 2 to 11 by a distributed unit, using one or more individual circuitries.

Referring to FIG. 14, the one or more communication control circuitry 1420 of the apparatus 1400 comprise at least a predictor circuitry 1421 which is configured to perform deriving predictions to whitening parameters according to embodiments. To this end, the predictor circuitry 1421 of the apparatus 1400 is configured to carry out at least some of the functionalities of the apparatus described above, e.g., by means of FIGS. 2 to 11 by means of the intelligent whitening controller, using one or more individual circuitries.

Referring to FIG. 12, 13, 14, the memory 1230, 1330, 1430 may be implemented using any suitable data storage technology, such as semiconductor based memory devices, flash memory, magnetic memory devices and systems, optical memory devices and systems, fixed memory and removable memory.

Referring to FIG. 12, 13, 14, the apparatus 1200, 1300, 1400 may further comprise different interfaces 1210, 1310, 1410 such as one or more communication interfaces (TX/RX) comprising hardware and/or software for realizing communication connectivity according to one or more communication protocols. The one or more communication interfaces 1210, 1310, 1410 may enable connecting to the Internet and/or to a core network of a wireless communications network. The one or more communication interface 1210, 1310, 1410 may provide the apparatus with communication capabilities to communicate in a cellular communication system and enable communication to different network nodes or elements. The one or more communication interfaces 1210, 1310, 1410 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the functionalities of the apparatus of Figure Y may be shared between two physically separate devices, forming one operational entity. Therefore, the apparatus may be seen to depict the operational entity comprising one or more physically separate devices for executing at least some of the described processes.

In an embodiment, at least some of the processes described in connection with FIGS. 2 to 11 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 11 or operations thereof.

Embodiments as described may also be carried out in the form of a computer process defined by a computer program or portions thereof. Embodiments of the methods described in connection with FIGS. 2 to 11 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor; and
at least one non-transitory memory storing instructions that, when executed with the at least one processor, cause the apparatus to perform:
receiving, with a first apparatus, in a downlink control information, whitening parameters;
receiving at least from a second apparatus one or more first uplink data streams;
applying the whitening parameters at least on the one or more first uplink data streams resulting to one or more whitened first uplink data streams;
performing one of forwarding, to the first apparatus, the one or more whitened first uplink data streams to be combined at least with one or more whitened second uplink data streams, or combining the one or more whitened first uplink data streams at least with the one or more whitened second uplink data streams and forwarding, to the first apparatus, one or more combined uplink data streams wherein the combining comprises selecting a subset of the one or more whitened first uplink data streams and the one or more whitened second uplink data streams and combining whitened uplink data streams in the subset.

2. The apparatus of claim 1, wherein the instructions, when executed with the at least one processor, cause the apparatus to perform:
receiving at least from a third apparatus one or more second uplink data streams; and
applying the whitening parameters on the one or more second uplink data streams resulting to the one or more whitened second uplink data streams.

3. The apparatus of claim 1, wherein the instructions, when executed with the at least one processor, cause the apparatus to perform:
receiving at least one of the one or more whitened second uplink data streams.

4. The apparatus of claim 1, wherein the wherein the instructions, when executed with the at least one processor, cause the apparatus to perform:
receiving, with the whitening parameters, at least one of information indicating uplink data streams to be combined or bandwidth available for uplink data streams; and
using said information when selecting the subset.

5. The apparatus of claim 4, wherein the bandwidth available for the uplink data streams is defined as maximum number N of spatial data streams supported with an open fronthaul interface, and the instructions, when executed with the at least one processor, cause the apparatus to determine the number M of uplink data streams to be selected to the subset so that the number of data streams to be forwarded after combining the subset is less than or equal to the maximum number N.

6. The apparatus of claim 1, wherein the one or more whitening parameters comprise at least a set of whitening coefficients per a frequency range.

7. The apparatus of claim 1, wherein the downlink control information further comprises one or more of
identification information of a target apparatus of the one or more combined uplink data streams;
identification information of one or more target apparatuses of the one or more whitening parameters;
information indicating one or more uplink data streams to which at least one of the one or more whitening parameters are to be applied;

information indicating a time when to apply the one or more whitening parameters; or a set of whitening coefficients per a frequency range.

8. An apparatus, comprising:
at least one processor; and
at least one non-transitory memory storing instructions that, when executed with the at least one processor, cause the apparatus to perform:
  receiving, with a first apparatus, in a downlink control information whitening parameters;
  forwarding the whitening parameters at least to a second apparatus and to a third apparatus;
  receiving, after the forwarding, at least from the second apparatus one or more whitened first uplink data streams and from the third apparatus one or more whitened second uplink data streams;
  combining at least the one or more whitened first uplink data streams with the one or more whitened second uplink data streams to one or more combined uplink data streams;
  forwarding, to the first apparatus, the one or more combined uplink data streams wherein the combining comprises selecting a subset of the one or more whitened first uplink data streams and the one or more whitened second uplink data streams and combining whitened uplink data streams in the subset.

9. An apparatus, comprising:
at least one processor; and
at least one non-transitory memory storing instructions that, when executed with the at least one processor, cause the apparatus to perform:
  receiving, from a fourth apparatus, a request for whitening parameters for one or more uplink data streams predicted to be received with one or more second apparatuses over a radio interface and to be whitened before combined to one or more combined uplink data streams;
  deriving predictions for the whitening parameters based at least on a predicted channel condition in the radio interface for the one or more data streams; and
  transmitting, with at least the fourth apparatus, in downlink control information, the predictions as the whitening parameters for the one or more uplink data streams to be whitened.

10. The apparatus of claim 9 wherein the instructions, when executed with the at least one processor, cause the apparatus to perform:
  receiving capability information of a network portion connected to the fourth apparatus with a fronthaul interface, the capability information indicating one or more nodes wherein the instructions, when executed with the at least one processor, cause the apparatus to perform applying whitening parameters and configuration information relating physical constraints of the fronthaul interface; and
  using the capability information when deriving the predictions.

11. The apparatus of claim 9, wherein the instructions, when executed with the at least one processor, cause the apparatus to perform:
  receiving in the request further information, said further information including at least one of
    future scheduling information indicating resource allocation at a time the whitening parameters are to be applied,
    measured channel conditions in the radio interface,
    information relating to a joint reception with at least two second apparatuses at the time the whitening parameters are to be applied,
    mobility information of one or more fifth apparatuses scheduled to transmit uplink data at the time the whitening parameters are to be applied, or
    spatial stream assignment of one or more fifth apparatuses scheduled to transmit uplink data at the time the whitening parameters are to be applied; and
  using the further information when deriving the predictions.

12. The apparatus of claim 11, wherein the instructions, when executed with the at least one processor, cause the apparatus to implement the predictions as a trained model configured to receive the further information as input and to output the predictions for whitening parameters per a second apparatus.

13. A method comprising performing, with an apparatus, at least one of a first functionality, a second functionality, or a third functionality,
  wherein the first functionality comprises at least:
    receiving, with a first apparatus, in a downlink control information, whitening parameters;
    receiving at least from a second apparatus one or more first uplink data streams;
    applying the whitening parameters at least on the one or more first uplink data streams resulting to one or more whitened first uplink data streams; and
    forwarding, to the first apparatus, the one or more whitened first uplink data streams to be combined at least with one or more whitened second uplink data streams,
  wherein the second functionality comprises at least:
    receiving, with a first apparatus, in a downlink control information, whitening parameters;
    receiving at least from a second apparatus one or more first uplink data streams;
    applying the whitening parameters at least on the one or more first uplink data streams resulting to one or more whitened first uplink data streams;
    combining the one or more whitened first uplink data streams at least with the one or more whitened second uplink data streams with selecting a subset of the one or more whitened first uplink data streams and the one or more whitened second uplink data streams and combining whitened uplink data streams in the subset; and
    forwarding, to the first apparatus, one or more combined uplink data streams,
  wherein the third functionality comprises at least:
    receiving, with a first apparatus, in a downlink control information whitening parameters;
    forwarding the whitening parameters at least to a second apparatus and to a third apparatus;
    receiving, after the forwarding, at least from the second apparatus one or more whitened first uplink data streams and from the third apparatus one or more whitened second uplink data streams;
    combining at least the one or more whitened first uplink data streams with the one or more whitened second uplink data streams to one or more combined uplink data streams with selecting a subset of the one or more whitened first uplink data streams and the one or more whitened second uplink data streams and combining whitened uplink data streams in the subset; and forwarding, to the first apparatus, the one or more combined uplink data streams.

14. A non-transitory computer readable medium comprising program instructions stored thereon for at least one of a first functionality, a second functionality, or a third functionality, for performing corresponding functionality:
  wherein the first functionality comprises at least:
    receiving, via a first apparatus, in a downlink control information, whitening parameters;
    receiving at least from a second apparatus one or more first uplink data streams;
    applying the whitening parameters at least on the one or more first uplink data streams resulting to one or more whitened first uplink data streams;
    forwarding, to the first apparatus, the one or more whitened first uplink data streams to be combined at least with one or more whitened second uplink data streams,
  wherein the second functionality comprises at least:
    receiving, via a first apparatus, in a downlink control information, whitening parameters;
    receiving at least from a second apparatus one or more first uplink data streams;
    applying the whitening parameters at least on the one or more first uplink data streams resulting to one or more whitened first uplink data streams;
    combining the one or more whitened first uplink data streams at least with the one or more whitened second uplink data streams with selecting a subset of the one or more whitened first uplink data streams and the one or more whitened second uplink data streams; and
    forwarding, to the first apparatus, one or more combined uplink data streams,
  wherein the third functionality comprises at least:
    receiving, via a first apparatus, in a downlink control information whitening parameters;
    forwarding the whitening parameters at least to a second apparatus and to a third apparatus;
    receiving, after the forwarding, at least from the second apparatus one or more whitened first uplink data streams and from the third apparatus one or more whitened second uplink data streams;
    combining at least the one or more whitened first uplink data streams with the one or more whitened second uplink data streams to one or more combined uplink data streams with selecting a subset of the one or more whitened first uplink data streams and the one or more whitened second uplink data streams; and
    forwarding, to the first apparatus, the one or more combined uplink data streams.

* * * * *